United States Patent [19]
Sohnchen et al.

[11] 3,821,675
[45] June 28, 1974

[54] SOLENOID ASSEMBLY AND THERMOELECTRIC FLAME FAILURE DEVICE

[75] Inventors: Ernst Sohnchen, Huckeswagen; Ernst Feldmann, Remscheid, both of Germany

[73] Assignee: Joh. Vaillant K.G., Remscheid, Germany

[22] Filed: Nov. 24, 1972

[21] Appl. No.: 309,149

[30] Foreign Application Priority Data
Mar. 23, 1972 Germany.......................... 2214063

[52] U.S. Cl.................................. 335/281, 137/66
[51] Int. Cl............................................. H01f 7/08
[58] Field of Search...... 137/66; 335/220, 281, 297, 335/296

[56] References Cited
UNITED STATES PATENTS
2,321,119   6/1943   Alpery.............................. 335/220
2,991,792   7/1961   Ray et al............................. 137/66
3,258,659   6/1966   Schmid et al. ................. 137/66 X FOREIGN PATENTS OR APPLICATIONS
995,272   6/1965   Great Britain....................... 137/66

Primary Examiner—George Harris
Attorney, Agent, or Firm—Toren, McGeady and Stanger

[57] ABSTRACT

In the solenoid assembly, a U-shaped electromagnet includes two core legs defining between them a space which is open at both ends, and a yoke connecting said core legs at one end thereof and having a bearing surface in contact with a carrying plate. Flange means are rigid with and project from the carrying plate and extend in part outside the yoke and in part into the space and in engagement with the yoke to clamp the same against said carrying plate. Electric winding means surround the core legs. The solenoid assembly is intended for use in a flame failure device, which comprises a valve stem and an armature plate which is connected to the valve stem and disposed adjacent to the ends of said core legs opposite to said yoke and adapted to be magnetically attracted by the core legs in response to a sufficient energization of said winding means.

9 Claims, 6 Drawing Figures

3,821,675

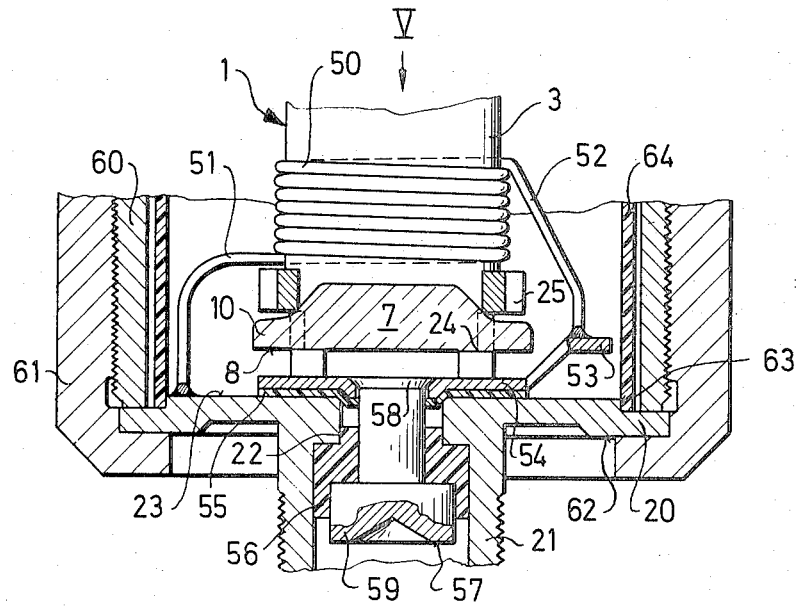
FIG. 4
FIG. 5
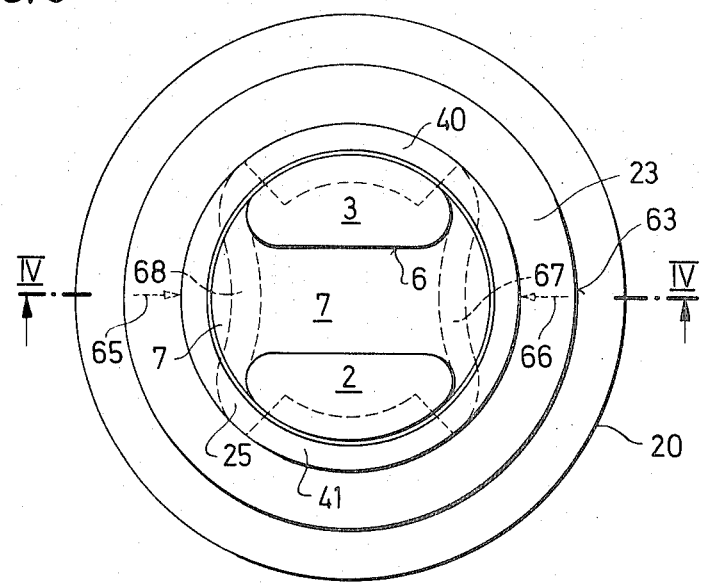

ic flame failure device, which comprises an armature plate, that is connected to a valve stem of a gas valve. The solenoid assembly comprises a U-shaped solenoid, which comprises a winding and an electromagnet having two spaced apart core legs, which are connected by a yoke having a bearing surface, which rests on a carrying plate, which at its periphery is provided with upstanding flange means extending outwardly of said yoke.

SOLENOID ASSEMBLY AND THERMOELECTRIC FLAME FAILURE DEVICE

This invention relates to a solenoid assembly for use as an insert in a thermoelectric flame failure device, which comprises an armature plate, that is connected to a valve stem of a gas valve. The solenoid assembly comprises a U-shaped solenoid, which comprises a winding and an electromagnet having two spaced apart core legs, which are connected by a yoke having a bearing surface, which rests on a carrying plate, which at its periphery is provided with upstanding flange means extending outwardly of said yoke.

In an assembly of that kind, which is known from Printed German Application 1,217,896, the yoke of the electromagnet has a central bore, which is not used for fixation but forms a passage for a conductor for supplying current to the winding. The bore in the bottom yoke of the electromagnet disturbs the lines of magnetic force so that the holding magnetic force is reduced. Owing to this disadvantage, the dimensions selected for the electromagnet must be larger than would otherwise be required so that the costs of the electromagnet are obviously increased.

The U.S. Patent Specification 2,726,716 has disclosed a device for fixing an electromagnet whose bottom yoke has no through bore but is integrally formed with a rivet pin, with which the electromagnet is secured by riveting to the bottom of the housing which surrounds the electromagnet. This fixation involves the danger that the electromagnet may be subjected to mechanical forces which result in a change of the position of the surfaces which are disposed at the ends of the legs and engageable by the armature plate. As a result, the potential holding force of the solenoid is not fully effective and the predetermined spring force which biases a gas safety valve in its open position cannot be overcome by the solenoid.

It is an object of the invention to provide a joint between an electromagnet of the kind defined first hereinbefore, having no bore in its bottom yoke, and a carrying plate which in a manner known per se has a central bore which receives a contact rivet, to which a thermocouple for feeding the winding can be connected. Another object is to enable a fixation of the completely machined electromagnet directly on the seating surface of the carrying plate in such a manner that there is no action of forces resulting in a canting of the surfaces provided at the ends of the core legs for engagement with the armature. Besides, the magnetic holding force which is predetermined by the dimensions and the material of the electromagnet is to be optimally utilized.

These objects are accomplished according to the invention in that a part of the upstanding flange means is forces into the space between the two core legs of the electromagnet. This design of the solenoid assembly according to the invention affords the great advantage that any exertion of a force on the yoke of the electromagnet in the direction of the legs during the assembling is avoided. In this way, an inclination of the core legs relative to each other and a canting of those surfaces of the electromagnet which are engageable by the armature is precluded. Because the electromagnet need not have any bores or shaped portions for an interlocking engagement, the electromagnet can be manufactured in a relatively simple manner and at low cost.

A further feature of the invention resides in that the carrying plate has an annular seating surface and the upstanding flange means form a ring which is in part concentric with said seating surface. With that design, the yoke of the electromagnet is supported by the seating surface around a complete ring whereas the flange means also form a complete ring, which can be forced in a simple manner at two points into the slot between the two core legs of the U-shaped electromagnet.

An embodiment of the invention will be explained more fully with reference to FIGS. 1 to 5 of the drawings and embodies further features of the invention.

FIG. 4 is a sectional view showing the complete solenoid assembly.

FIG. 5 is a top plan view showing the solenoid assembly.

In all five figures, like reference characters designate like details.

Figure 1:
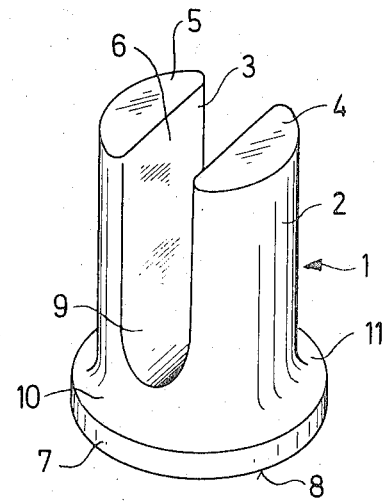
FIG. 1 is a perspective view showing the electromagnet.

FIG. 1 shows a U-shaped electromagnet 1 of soft iron. The electromagnet comprises two core legs 2 and 3, which terminate at bearing surfaces 4 and 5, both of which are tangent to a plane and engageable by an armature plate, which is connected to a valve stem in a thermoelectric flame failure device. A slot 6 extends between the two legs 2 and 3. The two core legs 2 and 3 are connected at their lower end by a yoke 7, which has on its underside a circular bearing surface 8. From the bearing surface, the yoke 7 tapers to the bottom 9 of the slot 6 so that the yoke 7 forms projections 10 and 11 on opposite sides.

Figure 2:
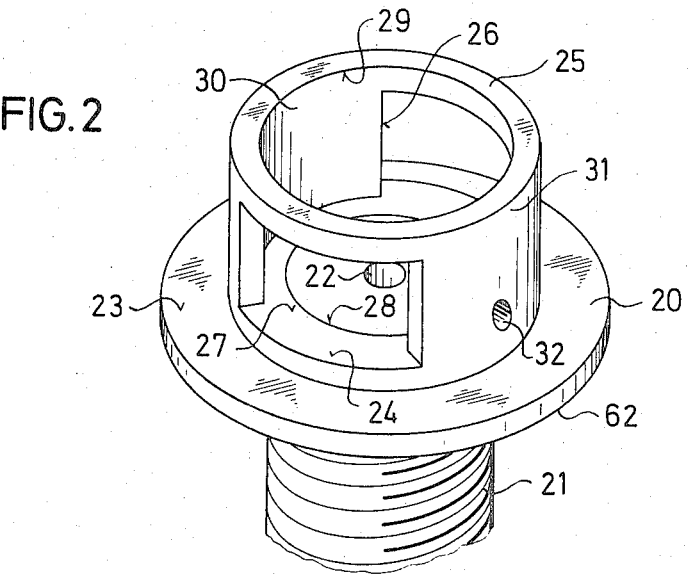
FIG. 2 is a perspective view showing the carrying plate integrally formed with the upstanding ring.

A carrying plate 20 shown in FIG. 2 is provided on its underside with a threaded shaft 21. The plate and the threaded shaft are formed with a common coaxial passage 22. The plate 20 is formed on its top 23 with a seating surface 24, which has the configuration of a circular ring, and with an upstanding ring 25. The seating surface 24 and the ring 25 are coaxial to the plate 20 and the passage 22. The ring 25 has diametrically opposite apertures 26 and 27. The inside diameter 28 of the seating surface 24 is smaller than the inside diameter 29 of the ring 25 so that the seating surface 24 forms a complete circular ring. The ring 25 comprises two wall portions 30 and 31, which are joined to the carrying plate 20. One of the wall portions 30 and 31 is formed with a radial through passage 32.

Figure 3:
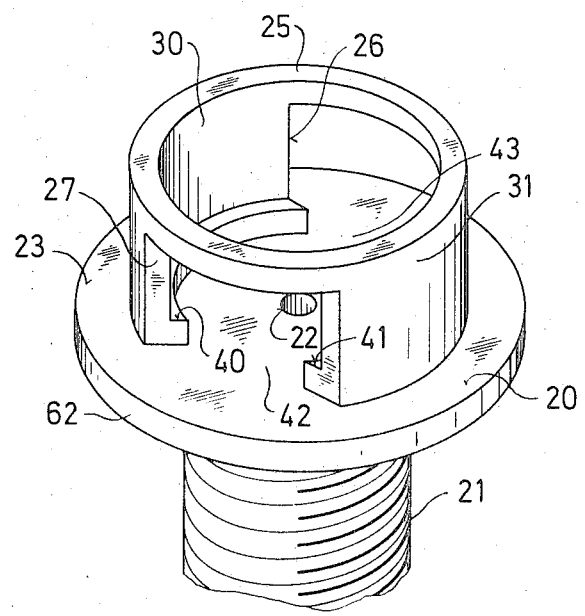
FIG. 3 is a perspective view showing a modified carrying plate according to FIG. 2.

The carrying plate 20 shown in FIG. 3 differs from that shown in FIG. 2 in that the apertures 26 and 27 of the hollow-cylindrical ring 25 extend as far as to the seating surface on the top 23 of the carrying plate 20. The seating surface 24 thus comprises two supporting surfaces 40 and 41 and intervening exposed surfaces 42 and 43. The apertures 42 and 43 shown in FIG. 3 are made simply by milling. The exposed surfaces 42 and 43 eliminate the need for the radial passage 32.

FIG. 4 is a fragmentary sectional view showing the complete solenoid assembly. Each of the two core legs 2 and 3 of the electromagnet is provided with a winding 50 of copper wire. The windings of the two legs are connected in series. One end 51 of the winding is electrically conductively connected to the top 23 of the carrying plate 20. The second end 52 is electrically conductively connected to a soldering end portion 53 of a soldering tag 54.

The soldering tag 54 rests on an insulating member 55, which lies on the top 23 of the carrying plate 20. The soldering tag and the insulating member extend over the exposed surfaces 42 and 43 of the carrying plate 20. An insulating tube 56 is inserted in the passage 22 of the threaded shaft 21 and in its interior receives a contact rivet 57. The carrying plate 20, the insulating member 55, and the soldering tag 54 are held in position by the contact rivet 57 between the heads 58 and 59 thereof.

The entire solenoid assembly is accommodated in a housing 60 and held therein by a cap nut 61, which interengages with the underside 62 of the carrying plate 20. A cap 64 of plastic material is held at a step 63 in the top 23 of the carrying plate 20 and is also clamped by the cap nut.

Figure 6:
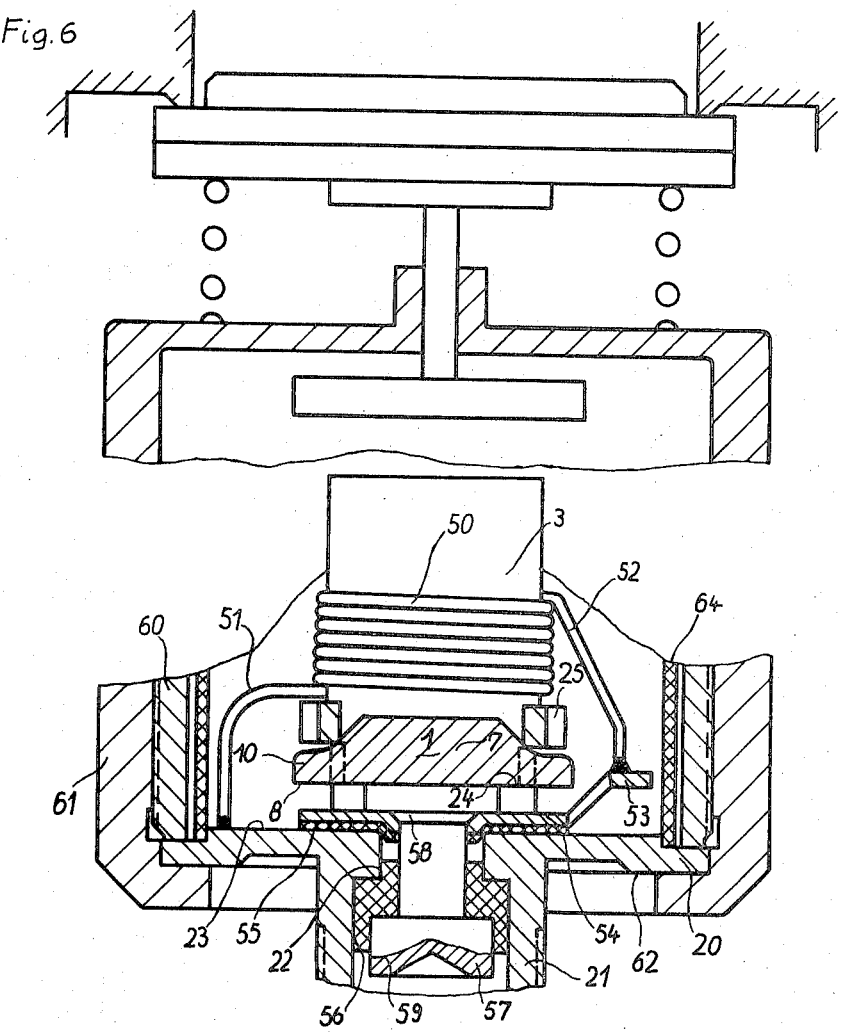
FIG. 6 is a sectional view illustrating the assembly of FIG. 4 with a valve stem and armature plate.

FIG. 5 shows the complete solenoid assembly of FIG. 4 in a top plan view, in which the cap nut, housing, cap of plastics material, and windings are omitted. It is distinctly apparent that the bottom yoke 7 of the electromagnet 1 rests on the supporting surfaces 40 and 41 and the upstanding ring has been bent inwardly in the direction of the arrow 65 and 66 adjacent to the exposed surfaces 42 and 43 into the slot 6 between the two core legs 2 and 3. That bent-in portion of the upstanding ring thus engages the projections 10 and 11 of the bottom yoke and ensures a reliable fixation without a shifting of the bearing surfaces 4 and 5 of the core legs. The forced-in portions 67 and 68 of the upstanding flange means need not essentially be interconnected. FIG. 6 shows the valve stem and armature with the assembly of FIG. 4.

What is claimed is:

1. A solenoid assembly which comprises
a carrying plate,
a U-shaped electromagnet comprising two core legs defining between them a space which is open at both ends, and a yoke connecting said core legs at one end thereof and having a bearing surface in contact with said carrying plate,
flange means rigid with and projecting from said carrying plate and extending in part outside said yoke and in part into said space and in engagement with said yoke to clamp the same against said carrying plate, and
electric winding means surrounding said core legs.

2. A solenoid assembly as set forth in claim 1, in which
said carrying plate has an annular seating surface in contact with said bearing surface, and
said flange means including a ring having a portion extending outside said yoke said portion being concentric to said seating surface.

3. In a thermoelectric flame failure device comprising a valve stem and an armature plate connected to said valve stem,
an improved solenoid assembly which comprises
a carrying plate,
a U-shaped electromagnet comprising two core legs defining between them a space which is open at both ends, and a yoke connecting said core legs at one end thereof and having a bearing surface in contact with said carrying plate,
flange means rigid with and projecting from said carrying plate and extending in part outside said yoke and in part into said space and in engagement with said yoke to clamp the same against said carrying plate, and
electric winding means surrounding said core legs,
said armature plate being disposed adjacent to the ends of said core legs opposite to said yoke and adapted to be magnetically attracted by said core legs in response to a sufficient energization of said winding means.

4. An assembly as in claim 2, wherein said ring includes a second portion extending into the space between said core legs, said second portion forming the part of said flange means extending into the space.

5. An assembly as in claim 1, wherein said flange means includes a pair of upstanding members projecting from the carrying plate and extending longitudinally along said legs, said members and said legs together being substantially aligned, said members terminating at the end away from said plate in an endless member surrounding said legs, said endless member being bent so as to extend between said legs into said space.

6. An assembly as in claim 5, wherein said members have cross sections which form arcs of a circle surrounding said legs.

7. A solenoid as in claim 6, wherein said flange means includes seating ledge means projecting from said members toward said legs at said carrying plate for seating said yoke.

8. A solenoid assembly as in claim 7, wherein said ledge means form an annular ring.

9. A solenoid assembly as in claim 7, wherein said ledge means include two actuate ledges extending along and within the base of each of said members.

* * * * *